United States Patent
Pan et al.

(10) Patent No.: US 10,970,437 B2
(45) Date of Patent: Apr. 6, 2021

(54) CALCULATING AND EXTRACTING JOULE-HEATING AND SELF-HEAT INDUCED TEMPERATURE ON WIRE SEGMENTS FOR CHIP RELIABILITY

(71) Applicant: ANSYS, Inc., Canonsburg, PA (US)

(72) Inventors: Hsiming Pan, San Jose, CA (US);
Zhigang Feng, San Jose, CA (US);
Norman Chang, Fremont, CA (US)

(73) Assignee: ANSYS, Inc, Canonsburg, PA (US)

( * ) Notice: Subject to any disclaimer, the term of this patent is extended or adjusted under 35 U.S.C. 154(b) by 0 days.

(21) Appl. No.: 16/750,966

(22) Filed: Jan. 23, 2020

(65) Prior Publication Data

US 2020/0159978 A1    May 21, 2020

Related U.S. Application Data

(63) Continuation of application No. 15/979,583, filed on May 15, 2018, now Pat. No. 10,579,757.

(60) Provisional application No. 62/515,800, filed on Jun. 6, 2017.

(51) Int. Cl.
| | |
|---|---|
| *G06F 30/23* | (2020.01) |
| *G06F 111/10* | (2020.01) |
| *G06F 119/06* | (2020.01) |
| *G06F 119/08* | (2020.01) |
| *G06F 119/10* | (2020.01) |
| *G06F 119/18* | (2020.01) |

(52) U.S. Cl.
CPC .......... *G06F 30/23* (2020.01); *G06F 2111/10* (2020.01); *G06F 2119/06* (2020.01); *G06F 2119/08* (2020.01); *G06F 2119/10* (2020.01); *G06F 2119/18* (2020.01)

(58) Field of Classification Search
CPC ........................................................ G06F 30/23
USPC ........................................................ 716/109
See application file for complete search history.

(56) References Cited

U.S. PATENT DOCUMENTS

| | | | |
|---|---|---|---|
| 9,721,059 B1 * | 8/2017 | Ethirajan | G06F 30/33 |
| 2010/0023903 A1 * | 1/2010 | Pramono | G06F 30/367 |
| | | | 716/106 |
| 2012/0096424 A1 * | 4/2012 | Burd | G06F 30/398 |
| | | | 716/136 |
| 2019/0197203 A1 * | 6/2019 | Catthoor | H02J 3/004 |

* cited by examiner

*Primary Examiner* — Suchin Parihar
(74) *Attorney, Agent, or Firm* — Wen-Jeng Vincent Lue

(57) ABSTRACT

Data is received that characterizes a chip in the package system (CPS) having a plurality of wires and vias. Thereafter, using the received data, a chip power calculation is performed. The chip power calculated is used to generate a thermal-aware power map. Further, package and system level thermal analysis is performed using the power map to generate a tile-based CPS thermal profile. A plurality of chip finite element sub-models are then generated that each correspond to a different tile. A thermal field solution is solved for each sub-model so that, for each wire, wire temperature rises are extracted from the corresponding the chip sub-model analysis and combined with temperature values from the CPS thermal profile. This extracting and combining is then used to generate a back-annotation file covering each metal wire and via in the CPS.

20 Claims, 14 Drawing Sheets

FIG. 12

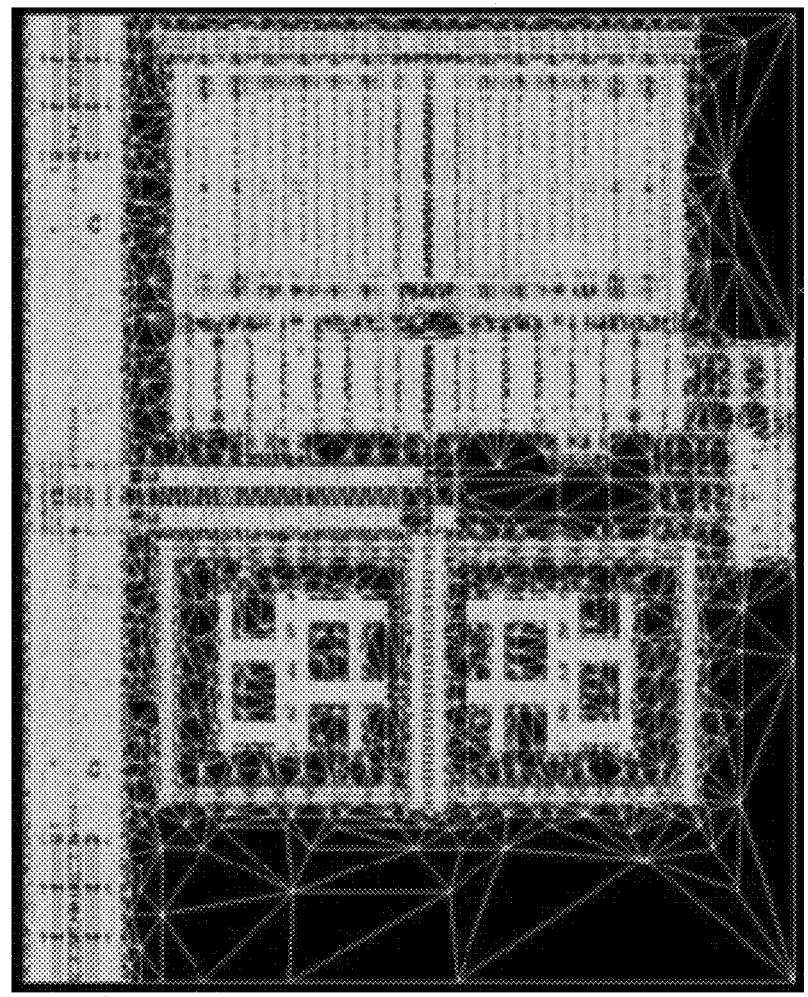
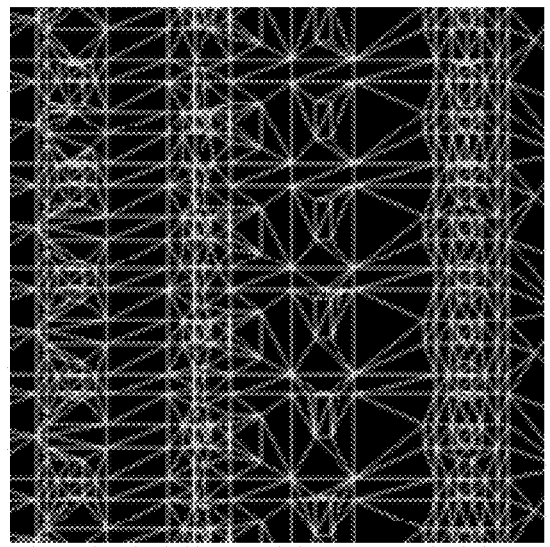
FIG. 6A
FIG. 6B

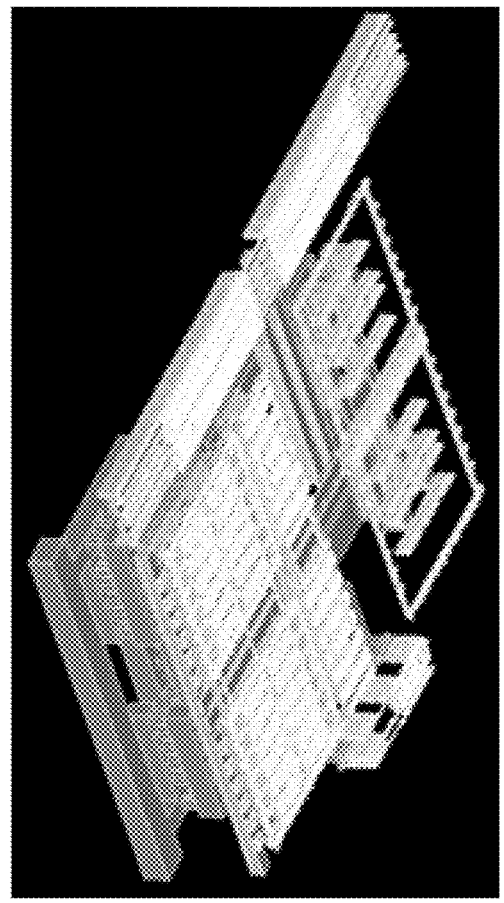
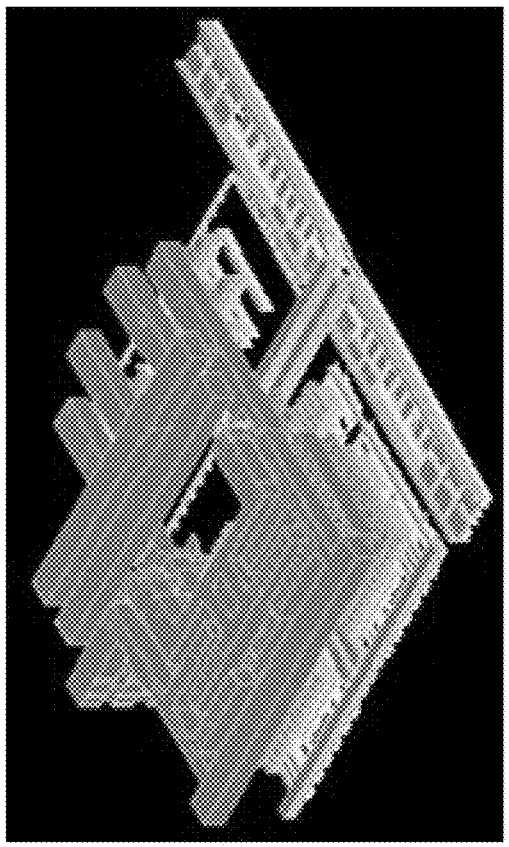

CALCULATING AND EXTRACTING JOULE-HEATING AND SELF-HEAT INDUCED TEMPERATURE ON WIRE SEGMENTS FOR CHIP RELIABILITY

CROSS-REFERENCE TO RELATED APPLICATIONS

This application is a continuation of U.S. patent application Ser. No. 15/979,583, filed May 15, 2018, entitled "Calculating and Extracting Joule-heating and Self-heat Induced Temperature on Wire Segments for Chip Reliability," which claims the priority to U.S. Provisional Application No. 62/515,800, filed Jun. 6, 2017, entitled "Calculating and Extracting Joule-heating and Self-heat Induced Temperature on Wire Segments for Chip Reliability," both of which are incorporated herein by reference in their entirety.

TECHNICAL FIELD

The subject matter described herein relates to techniques, including Finite Element methods and sub-modeling technologies to calculate and extract Joule-heating and self-heat induced temperature on wire segments for chip reliability.

BACKGROUND

Temperatures on wires in a chip are critical information in determining the allowable currents in wires to meet the expected Mean-Time-To-Failure (MTTF) as described in Black's equation (as illustrated in diagram 100 of FIG. 1), to predict reliability failure from Electromigration (EM) phenomenon in metal wire which generates undesired open or short of circuits over time of uses. Temperatures on wires/devices also have impacts on power (particularly leakage power, a strong function of temperature), resistance, EM limit, and consequently on timing, IR/dynamic voltage drop, and signal integrity.

Accurate temperature (steady-state) on wire is not easy to predict due to layout geometry complexity of the modern chips, affected by the following factors:

- Local wire temperature rises due to Joule-heating power from its average or root-mean-square (rms) current and thermal coupling among wires, where the local Joule-heating power is defined as $I*I*R_{wire}$ and I (current) can be $I_{avg}$ on power/ground wire or $I_{rms}$ on signal wire;
- Self-heating or local temperature rise from CMOS devices with devices in switching or idle mode; and
- Thermal environment of the chip in package with complex thermal conductivity distribution and multiple die heating, e.g., in 3D-IC, and variations of the Chip-Package-System (CPS) configurations.

SUMMARY

In one aspect, data is received that characterizes a chip in a package system (CPS) having a plurality of wires and vias. Thereafter, using the received data, a chip power calculation is performed. The chip power calculation is used to generate a thermal-aware power map. Further, package and system level thermal analysis is performed using the power map to generate a tile-based CPS thermal profile. For a chip, a plurality of chip finite element sub-models are then generated that each corresponds to a different sub-region of the chip. A thermal field solution is solved for each sub-model so that, for each wire, wire temperature rises are extracted from the corresponding the chip sub-model analysis and combined with temperature values from the CPS thermal profile. This extracting and combining is then used to generate a back-annotation file covering each metal wire and via of a chip in the CPS environment.

The chip power calculation can determine chip power map, hot interconnect geometry, Joule heating, device size and location, and/or power list. The solving can use a finite element field solver. The finite element field solver can use a heat conduction equation derived from Fourier's law and conservation of energy. The solving can be performed in parallel by a plurality of data processor cores. The sub-models can include device power. The sub-models can include known device temperature rise. A final temperature in the back-annotation file can be a temperature on each wire in CPS condition plus the temperature rise from the corresponding sub-model.

A wire geometry specified in the received data can be subdivided into wire segments based on geometry branching for electronic networking. The subdivided wire geometry can be flattened to generate a two dimensional template mesh including all outlines on every layer. Two dimensional layer meshes can be generated for each layer of the CPS. Alternative three dimensional finite element sub-models can be generated using line elements for wire segments. Effects of electron scattering in connection with the thermal conductivity of metal in thin layers can be determined. Beyond the thermal conduction analysis, one sub-model can be converted into a thermal stress model to characterize thermal stress in interconnection layers.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIGS. 6A-B are diagrams illustrating template mesh in the sub-model region (FIG. 6A) and zoom-in (FIG. 6B);

FIGS. 9A-B are diagrams illustrating wire metal in a 3D FE sub-model with a view from top (FIG. 9A) and bottom (FIG. 9B);

DETAILED DESCRIPTION

Figure 1:
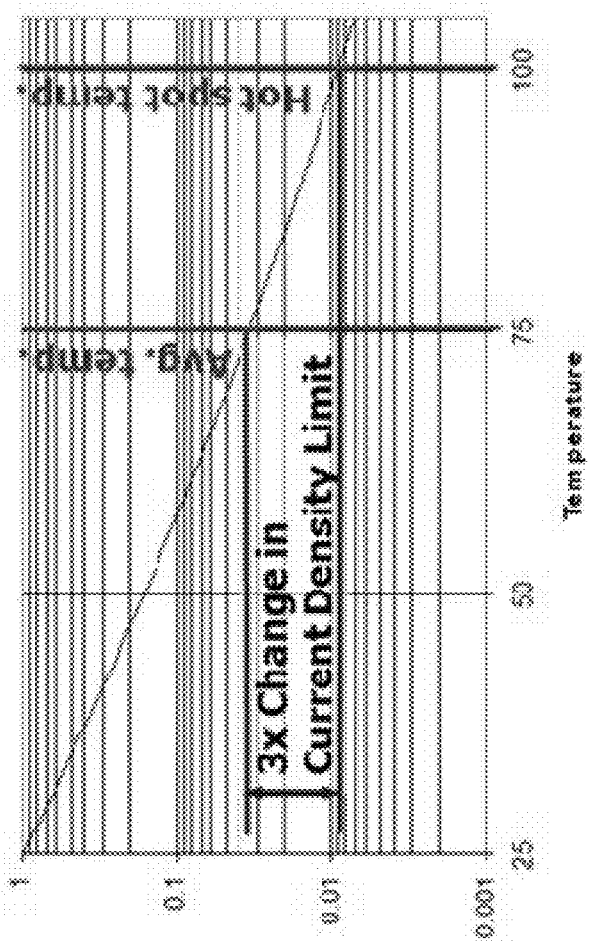
FIG. 1 is a diagram illustrating Black's question for Mean-Time-To-Failure.

The current subject matter is directed to extracting realistic local temperature rises on wire segments due to Joule heating and the local self-heat-induced temperature rises from devices in a chip due to (i) local wire temperature rises caused by Joule-heating power and/or (ii) self-heating or local temperature rise from CMOS devices with devices in switching or idle mode using the finite element thermal field solution for an actual chip layout. The resulting local temperature rises on wire segments from the aforementioned can be combined with the CPS environment temperature to predict the final temperature on wires for accurate chip reliability evaluation. In addition to the steady-state thermal response, the current techniques for chip sub-modeling also extend to thermal transient and thermally induced stress in wires/vias/dielectric.

The best thermal solution in current technology with minimal assumptions is to model the details in chip wire geometry with Joule heating directly by numerical discretization, such as the finite element method. The details of the wire geometry on all the wires are necessary in the analysis model as the focus now is on the local temperature rises due to Joule heating. However, due to the large number of wires in a chip design, more than multi-millions, with explicit wire/via geometry along with the dielectric fillings in analysis, the finite element modeling and analysis of real design layout was not an easy task.

Current industry practices use the foundry supported Joule heating formulas for temperature rise in each wire which are only layer and wire width dependent, and the foundry provided self-heat-induced temperature rise or thermal resistance data for devices. The formulas for Joule heating from foundry are usually very pessimistic as the actual layout cannot be accounted for in simple formulas, e.g., assuming multiple-parallel wires in the same layer at the same Joule heating power, or assuming one-dimensional heat conduction in thickness direction only. The results from the formulas are without the effects from the neighboring wire layouts on the same layer or/and on the adjacent layers. Hence the resulting local temperature rises on wires due to Joule heating by formulas could be far from the real thermal fields. The real local temperature rises on wires can only be simulated through detailed finite element solution with minimal assumptions.

A new approach to accurately calculate the local thermal responses of wires in chip interconnection layers is provided herein. The process can be fully automated from chip layout design inputs, finite element modeling and analysis, wire temperature extraction, and back-annotation for chip reliability evaluation in an efficient way.

Conventional thermal modeling for chip temperature in CPS (Chip-Package-System) environment using finite element (FE) methods can include generating a tile-based power map library with temperature dependency (CTM) for each chip with chip layout design and associated inputs for power calculation and RC extraction as die power input in CPS thermal analysis. The resulting chip thermal profile, typically tile-based at 10×10 μm resolution, can be used for wire temperature back-annotation for the thermal-aware EM evaluation in chip sign-off.

The thermal analysis model can include the dies in a package on thermal board or in a CPS environment. In modeling of package and system, each chip was typically simplified and represented by a silicon block with a power map (CTM) on top or bottom face for die-up or die-down placement in package. For efficiency in solution, there are limitations in the granularity of the FE modeling inside each chip in the package so that the individual wires cannot be modeled explicitly. This arrangement is often sufficient for older technology of 28 nm or earlier in which the localized heating on chip wires were not significant due to thicker wires in design and the planar CMOS used which has negligible internal thermal resistance. For new technology of 16-7 nm and beyond, the thin deep sub-micron wires embedded in low-K dielectric material layers may lead to localized but outstanding temperature rises (T-rises) on wires and FinFET devices of 3-D structure with high thermal resistance are used (i.e., higher T-rises per unit power on devices) the thermal impact due to these localized heating to wire EM is significant and a different approach for accurate chip wire thermal prediction must be used.

To address the high temperature-rise issue for EM reliability for 16 nm processes and beyond, some chip foundries utilize formula-based solutions for T-rises on wires and implemented in a few EDA tools through co-working with foundries. Typically, each layer has its own T-rise formula which is pessimistic so that it can be used for any wire segment in the same layer regardless of the real layout. However, the resulting wire temperature cannot reflect the real thermal field in actual operating conditions with complex thermal couplings. When the T-rise of a wire segment calculated was high so that the EM rule was violated, there could be doubt if the wire layout should actually be fixed to pass the EM rule for sign off. The fix of wire configurations can be costly and the high T-rise calculated by foundry formulas may not be accurate. Thus, there is a need to get a precise wire T-rise.

Figure 2:
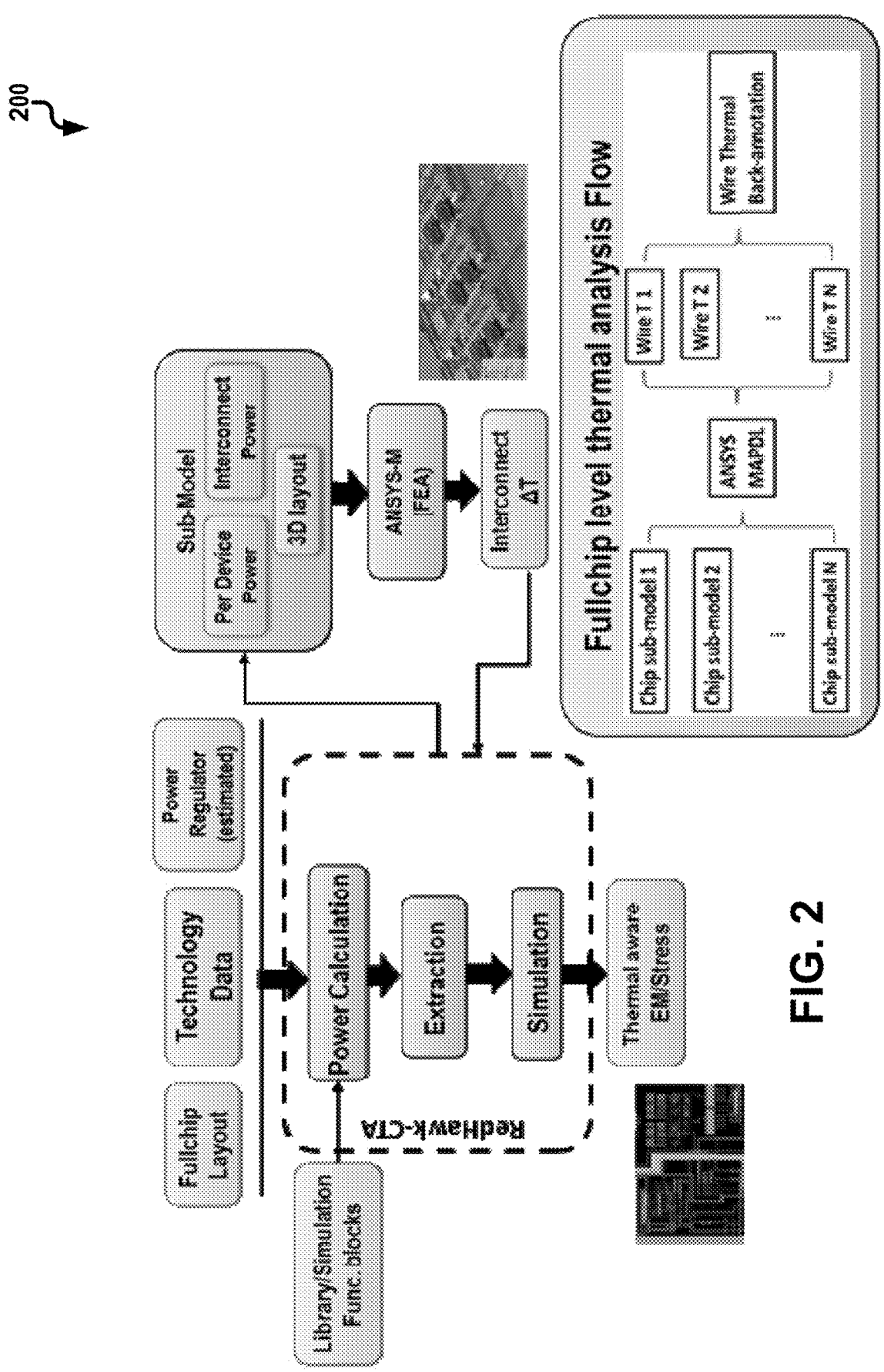
FIG. 2 is a diagram illustrating thermal modeling for wire/via details inside the chip design which includes thermal effects of wires with Joule heating and devices with self-heat.

FIG. 2 is a diagram 200 illustrating thermal modeling for wire/via details inside the chip design which includes thermal effects of wires with Joule heating and devices with self-heat. The model can be informed, at least based in part, through temperature observation and measurement of real world chips to ascertain aspects of their behavior in certain configurations (e.g., using real-world, physical temperature measurements of a chip to train the model). These thermal effects cannot be simulated using conventional solutions at the CPS level. The flow starts from chip design inputs for power calculation and RC extraction so that the wire layout with Joule heating and device heating information can be dumped for the convenience of thermal FE sub-modeling. The sub-modeling is referring to a partial area range of a chip design proper for efficient FE solution using the current technology.

Figure 3:
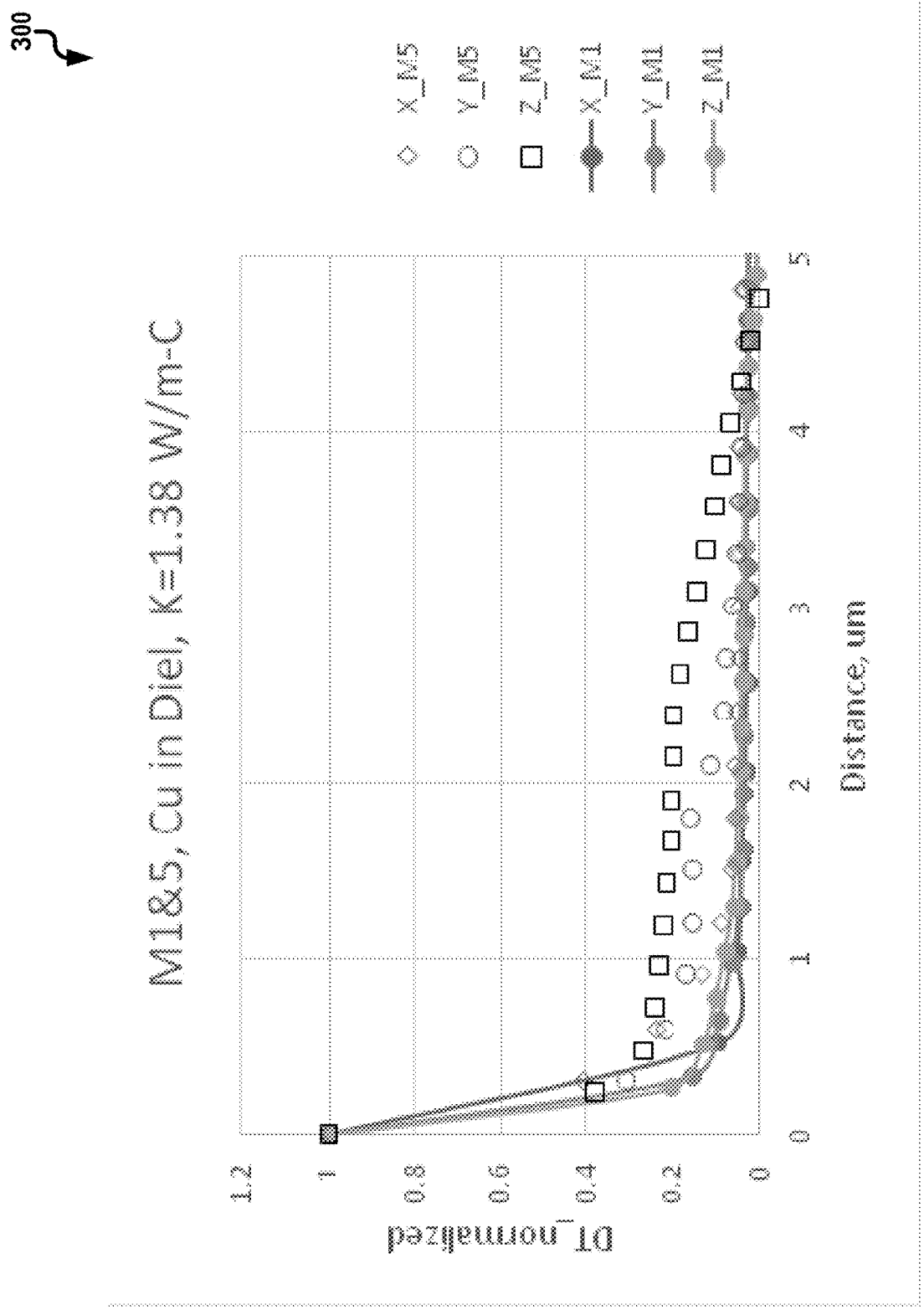
FIG. 3 is a diagram illustrating the localization of thermal effects in wires in dielectric media.

The purpose of the flow in FIG. 2 is for the T-rise calculation on wires. This can be achieved by assigning isothermal boundary conditions, e.g., 70C, on top of the top layer and on the bottom of the Si substrate while the other four sides of the sub-model left as insulated. The T-rise on each wire is the difference of the resulting wire temperature and the prescribed BC at constant temperature. For the final thermal profile reflecting CPS thermal responses, the T-rise solution can simply be added upon that from the CPS thermal profile. FIG. 2 also illustrates that the sub-model can be for a sub-region on a chip, e.g., 60×60 μm in sizes, or for a full but smaller chip design, e.g., a PMIC of 320×130 μm in size. The T-rise or Delta T for the full chip in the wire thermal back-annotation file can be obtained by accumulating the results of each sub-regions. This is based on the fact that thermal effects in wires are localized in the dielectric media, limited to the range of around 5 μm only (see diagram 300 of FIG. 3). The data in FIG. 3 is from a typical modern chip design with 12 metal layers which showed that the Delta T effect from the edge of a heating wire almost diminished at a distance 5 μm in any direction in the dielectric layers. The higher layers, e.g., M5, have thicker and longer wires that will slow down the decay rate locally due to more metal contents in the layers. But, both decay behaviors for lower and higher metal layers gave a similar cut-off around 5 μm.

The sub-model assumes reflective or insulated thermal boundary conditions at the four cutting edges. This is in general slightly pessimistic for the wires near or at the edges as heat cannot flow in or out. To avoid missing the local thermal effects of the hot spots on the other sides of the cutting edges, one may extend the sub-model/region at the edges by 5 μm and use the worst Delta T simulated for wires in the overlapping zone while scanning through the sub-regions in generating the back-annotation file at the full chip level.

For T-rise on FinFET devices, the modeling of individual or combination of a serial/parallel FinFET set geometry by FEM is possible but there can be many parameters not typically available to EDA tool users, e.g., exact FinFET geometry and material distributions/properties which are usually proprietary to foundries only. Hence the scope of discussion here is more limited to wires in dielectric layers. As a good approximation to the local T-rises, the device heating in FE implementation can use power on areas of Oxide Diffusion (OD) regions or on Cells/Instances, or, if available, the prescribed Delta T on each FinFET device area based on foundry inputs at 16 nm node and beyond, or products of power and foundry provided thermal resistance for FinFET design. Once the powers or Delta T's are allocated on devices, the FEOL (Front End of Line) to BEOL (Back End of Line) thermal coupling is included in the sub-model analysis directly through thermal field solution. For the device of BJT with power on emitter as OD, there is a guard ring or deep trench enclosing the emitter which creates significant thermal resistance in the BJT device. The guard ring/trench of low conductive material can be modeled directly in the FE sub-model in the simulation.

In the FE modeling and analysis steps, efficient parallel processing technology can be implemented to shorten the time required ranging from a few minutes to one or two hours which is acceptable in comparison with the time used for typical chip electric power calculations.

Figures 4A, 4B:
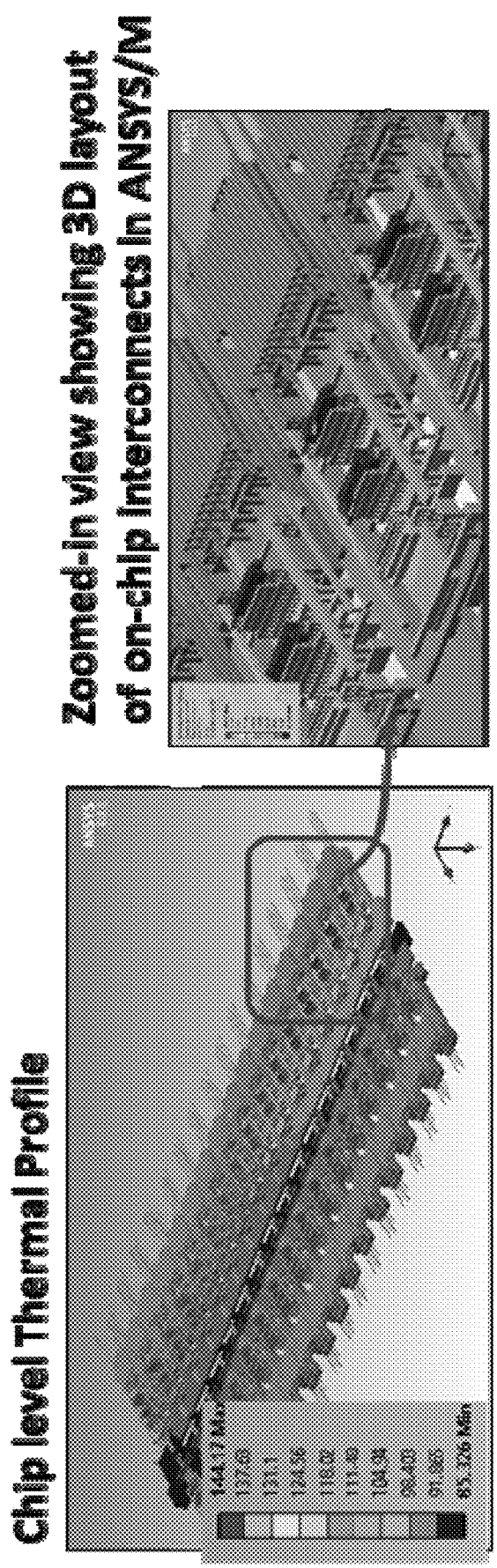
FIGS. 4A-B are diagrams illustrating chip wire temperature profiles with design details of wires/vias.

FIGS. 4A-4B form a diagram 400 providing an example of the FE model and thermal results on chip wires showing the same details as the chip design layout. Note that the modeling and analysis process can be fully automated and using high performance computing features. The use of FE sub-model can also be extended to thermal transients and stress failure evaluation for chip reliability.

With the current subject matter, finite element analysis can be used to model the chip layout directly for wire temperature responses due to Joule heating on wires and self-heating from devices. The FE sub-model generation is based on chip design layout using efficient parallel processing in data import and model generation. Wire geometry are subdivided into wire segments based on geometry branching for electric networking for the needs of EM evaluation. Flatten wire geometry and generate a 2-D template mesh with all the outlines on every layer are included. Every geometry branching, vias, and device outline are included in geometry illustrated in diagram 500 of FIG. 5 and in the template mesh illustrated in FIGS. 6A-6B which form diagram 600.

Figure 7B:
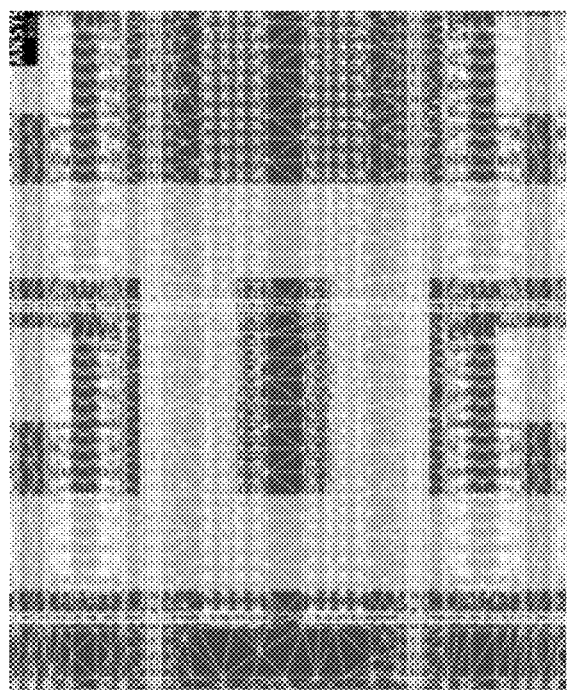
FIGS. 7A-B are diagrams illustrating mesh on M12 layer with differentiations for metal and dielectric with a sub-model region (FIG. 7A) and zoom-in for mesh details (FIG. 7B)
Figure 7A:
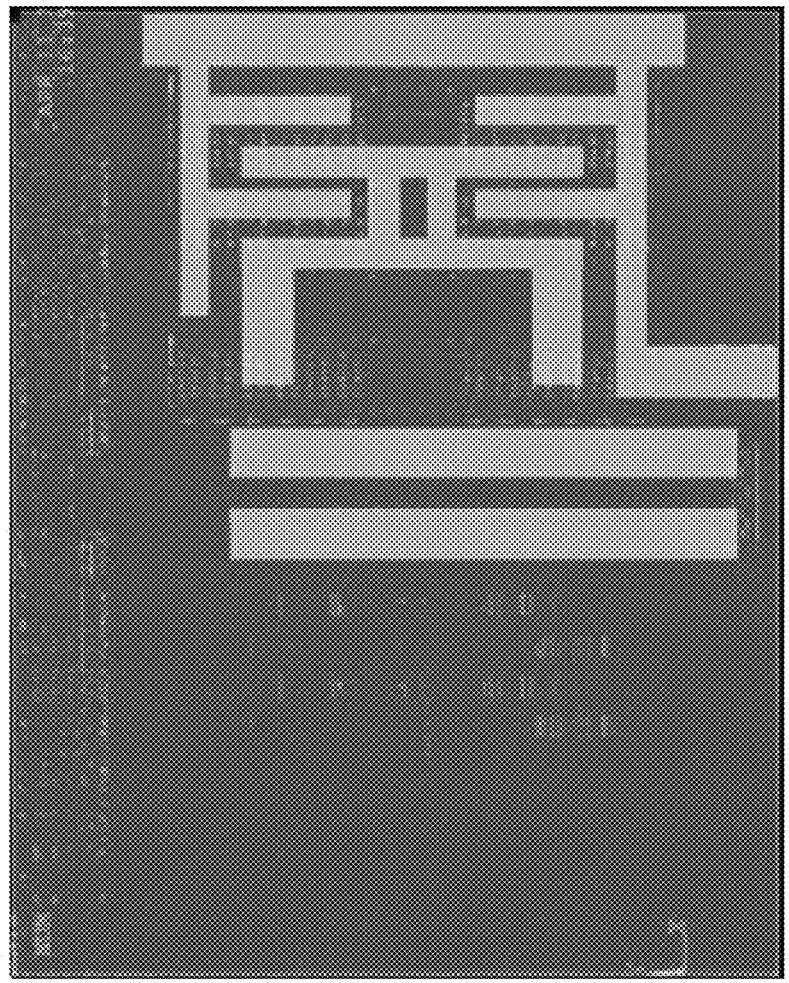
Figure 8B:
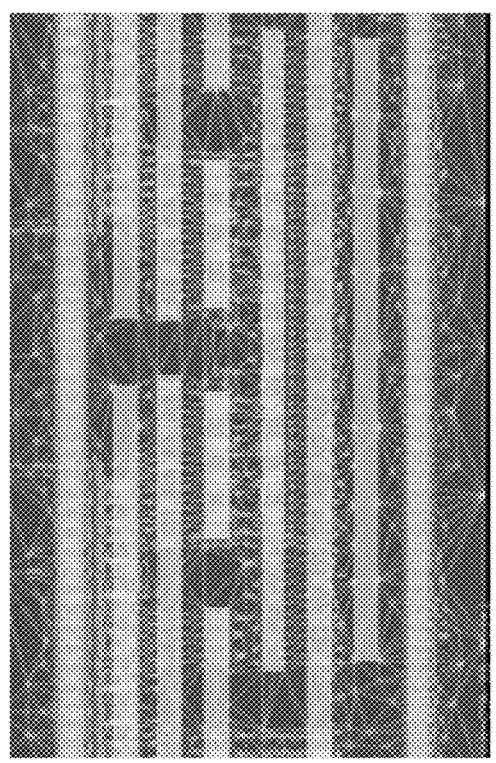
FIGS. 8A-B are diagrams illustrating mesh on M1 layer with differentiations for metal and dielectric with a sub-model region (FIG. 8A) and zoom-in for mesh details (FIG. 8B)
Figure 8A:
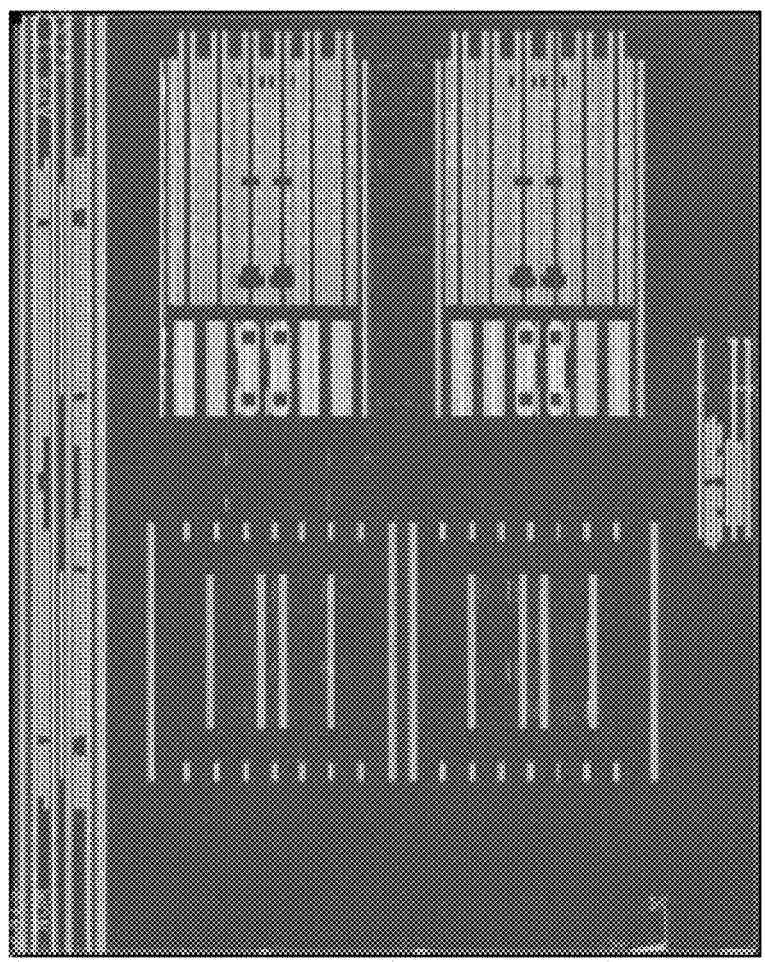

Create 2-D layer meshes for chip layers, from Si substrate, device layer, to metal/via layers, with proper material distribution at different elevations, i.e., all the wires/vias are modeled exactly to the chip design layout (see diagram 700—FIGS. 7A-B and diagram 800—FIGS. 8A and 8B).

Extrusion of 3D FE sub-model with conforming meshes through the thickness of each layer, with exact wires/vias geometry in the 3-D mesh (see diagram 900 of FIGS. 9A-B) using solid FE elements.

Alternative 3D FE sub-model using line elements for wire segments, for reduced model sizes.

The 3-D FE sub-model illustrated in FIGS. 9A-B is accurate but could be very large in model size and may be difficult in modeling or solution on common platforms. An equivalent 3-D FE model as described below could reduce the analysis model size for efficiency but with good accuracy.

Instead of solid elements for wires as described in items 1)c and 1)d above, use "lines" to represent the wire segments and vias in the 3-D FE sub-model.

Figure 5:
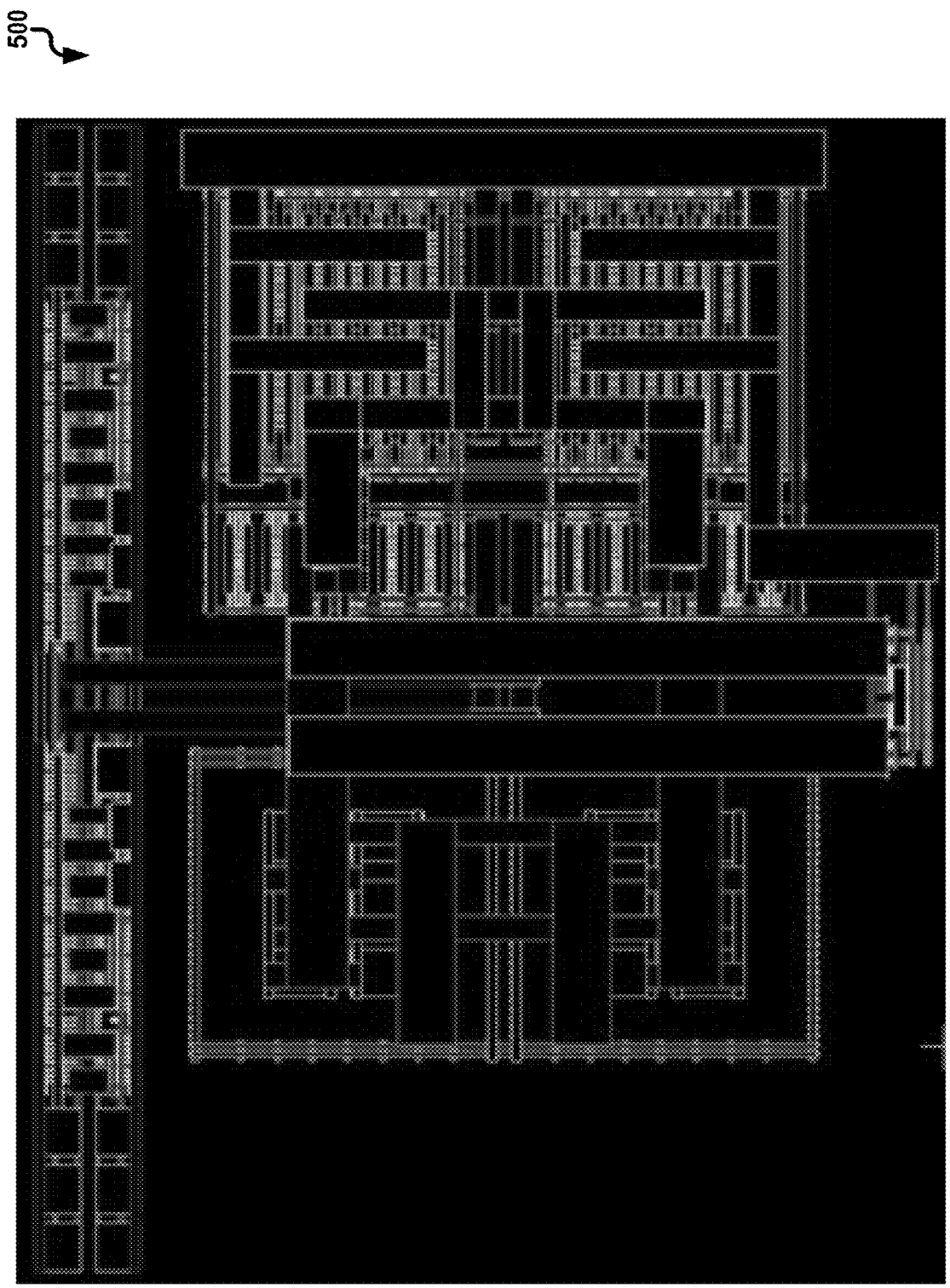
FIG. 5 is a diagram illustrating outlines of wires, vias, and devices.

In template geometry of FIG. 5, use center lines of the wire segments to replace the wire polygons for template mesh generation with "lines" for wires in the design layout.

Like as referenced above, extrusion can be used to generate 3D FE sub-model. The resulting solid elements are for dielectric and silicon substrate layers with line elements for metal wire segments and vias overlaid or embedded to the edges of the 3-D solid element mesh. The line elements for wire segments are placed on top of each metal layer. The cross-sectional areas of wires are assigned to the line elements of each wire segment. Line elements for vias penetrated through the thickness of the metal layer and connected to the nodes of the line elements for wire segments. The material distribution of metal and dielectric are of closed proximity to the real layouts.

The Joule heating power on wire segments are converted to equivalent thermal loads to the line elements.

The finite element modeling is based on heat conduction equation derived from Fourier's law and conservation of energy.

$$\frac{\partial}{\partial x}\left(K_x \frac{\partial T}{\partial x}\right) + \frac{\partial}{\partial y}\left(K_y \frac{\partial T}{\partial y}\right) + \frac{\partial}{\partial z}\left(K_z \frac{\partial T}{\partial z}\right) = \rho c \frac{\partial T}{\partial t}$$

$T = T(x, y, z; t) = $ Temperature Distribution $K_x = $ Thermal Conductivity in the $x$-direction $K_y = $ Thermal Conductivity in the $y$-direction $K_z = $ Thermal Conductivity in the $z$-direction $\rho = $ Mass Density $c = $ Heat Capacity The discretized finite element equations for heat transfer problems have the following finite form at steady-state:

$$[K]\{T\} = \{R\}$$

Here [K] is the stiffness matrix with equivalent conductive information; {R} is the vector of known thermal boundary conditions and heat flux loading; {T} is the nodal temperature of the finite elements to be solved.

Temperature T(x,y,z) at any location on the wires can be calculated from the nodal solution vector of {T} by T(x,y,z)=[N]{T}. Here [N]=[N1 N2 . . . ] and {T}={T1 T2 . . . }. Shape functions Ni are used for interpolation of temperature inside a finite element. The shape functions of a hexahedral linear 8-node element are $$N_i = \frac{1}{8}(1+\xi_0)(1+\eta_0)(1+\zeta_0) \text{ with } i = 1, 8$$

Here $\xi_0 = \xi\xi_i$, $\eta_0 = \eta\eta_i$, $\zeta_0 = \zeta\zeta_i$ with $\xi_i$, $\eta_i$, $\zeta_i$ being values of local coordinates 11, at nodes in an element.

Thermal conductivity of the metal in thin layers could be affected by the effects of electron scattering at grain boundary of the material. FIGS. 9A-B are a diagram 900 that illustrates the reduction of the effective thermal conductivity of thin Copper film which could be used to account for this effect in using the Fourier's law.

Joule heating can then be applied on metal layers for each wire ($I^2R$) which was calculated from the electrical power analysis and self-heating or foundry supported delta-T on devices represented by areas of OD (Oxide Diffusion) and/or instance for analog and digital design, respectively. Delta-T on devices can also be simulated from 3-D FE modeling and simulation through thermal characterization of the transistor geometry, calculated by the product of the power on a device area and the equivalent thermal resistance of the devices. Apply isothermal BC, i.e., uniform environment temperature, on top/bottom faces of the chip in sub-model, for the ease of calculating delta T of each wire which is the difference of the response temperature on each wire and the prescribed temperature on top/bottom face. The resulting delta T of a wire is from pure Joule heating if the powers on other wires and devices were removed or set to zero before solution.

The model generation above provides efficient file I/O to FE solver and minimizing the resulting file sizes from the FE solver. Further, the current subject matter is advantageous in that it can use high performance (parallel) computing feature in FE solver for accelerated solution.

Subsequently, wire temperature on nodes from FE sub-model results can be extracted and mapped to wire segments for EM calculations. Though the thermal field solution on a wire which includes one or multiple wire segments is usually with thermal gradients, the temperature on each wire segment can be treated as constant in EM evaluation. Hence, the average or the maximum temperature of the elements falling inside the wire segment area is used in EM analysis. Formulas, such as those identified above, can be used to map the nodal temperature to the range of each wire segment for the thermal back-annotation file for EM calculation.

The sub-model may cover only part of the full chip. In such case, scan through the full chip with repeated sub-modeling and temperature mapping process until all the wire segments have temperature rise information using FEM.

Further, device power or known device T-rise can be included in the sub-model for accurate T-rise on wire.

If CPS environment is to be included in the thermal back-annotation, the final temperature on a wire in the back-annotation file is the temperature on a wire in CPS condition plus the T-rise from the sub-modeling analysis.

Figure 10:
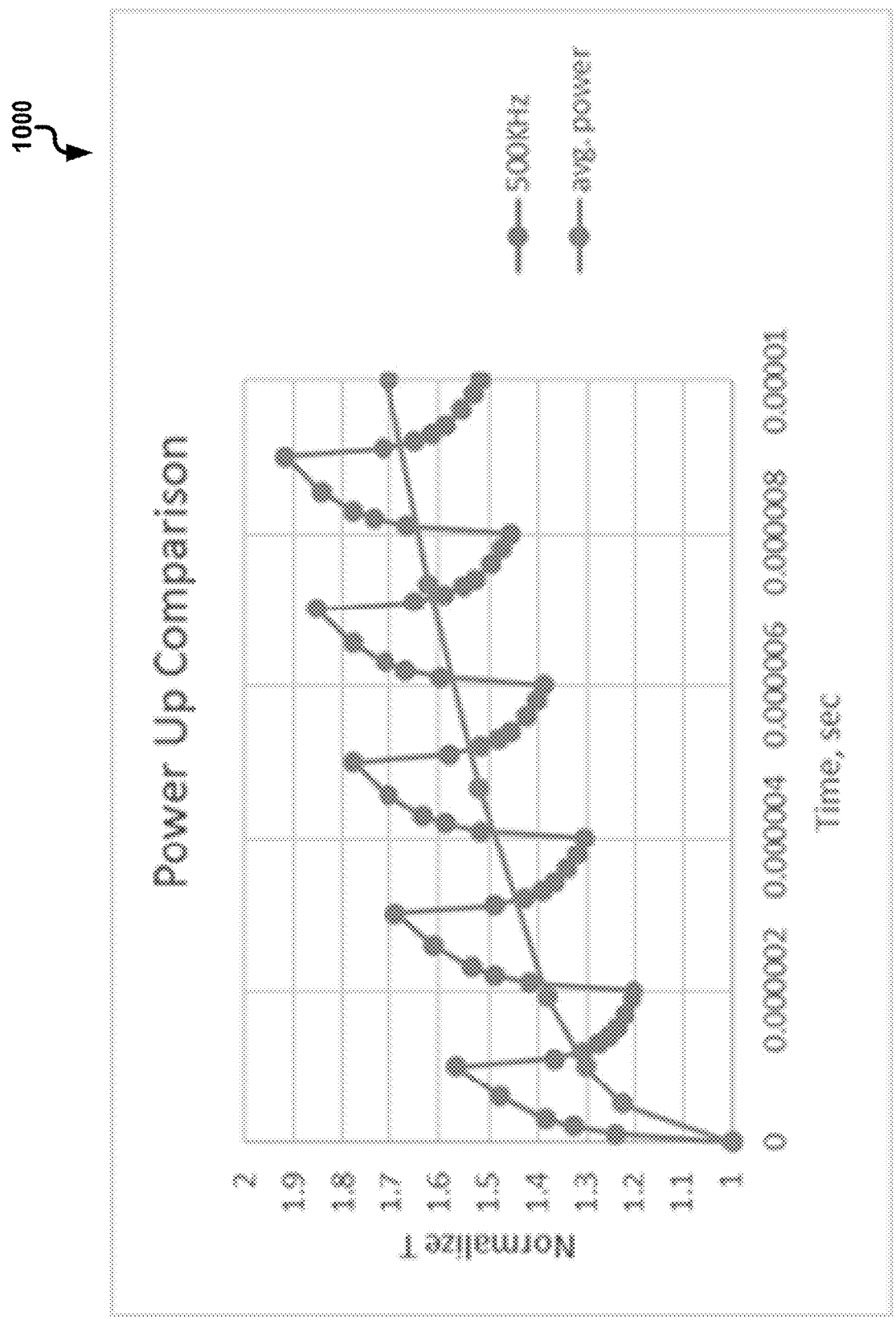
FIG. 10 is a diagram illustrating thermal transient analysis on chip wire for power on-off at 500 KHz using FEM, compared to the temperature rise due to steady average power condition.

In addition, the back-annotation file can provide DC EM on wires with back-annotated temperature The Joule heating power as input to the thermal sub-model is associated with the states of the circuits in the chip. For the given state on-off conditions, the thermal sub-model can be arranged for thermal transient analysis with the scaling for Joule heating on wires and devices so that multi-states and multi-power-modes can be reflected in a time duration sequences. The resulting temperature responses on wires/vias can be extracted as in diagram 1000 of FIG. 10. Excessive temperature over-shooting, e.g., in PMIC cases, is of concern for the functionality and reliability of the chip.

Figure 11:
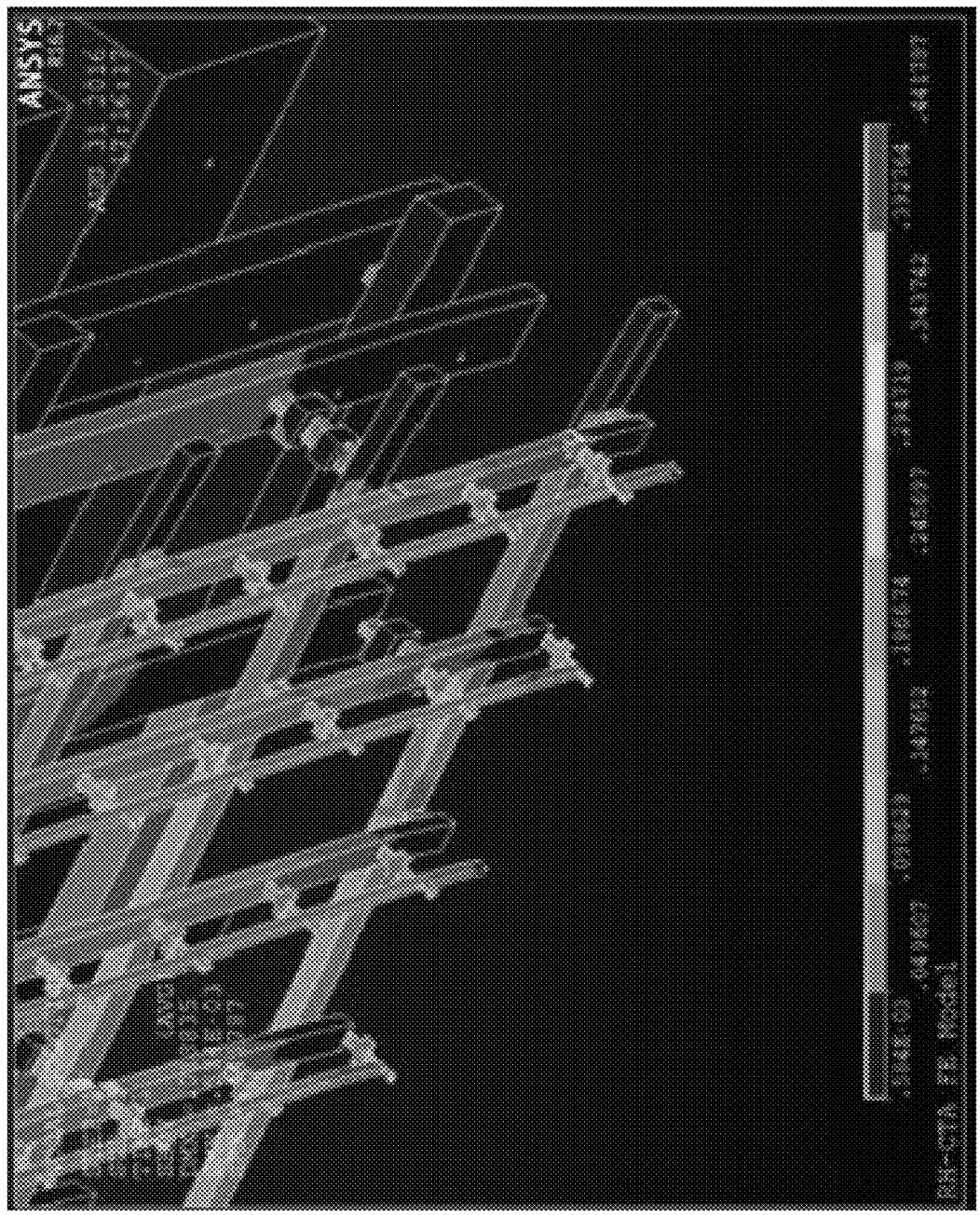
FIG. 11 is a diagram illustrating equivalent stress on chip metal.

Thermal-stress evaluation through sub-modeling. Stress in the brittle and weak dielectric layers or in metal wires/vias could be of concern in design or in troubleshooting of chip failures. The sub-model with wire outline details described above can be converted to a thermal stress model to check thermal stress in the interconnection layers. The temperature solution on FE nodes in thermal analysis can be stored and used as thermal load for stress analysis. Extensional stresses in the brittle dielectric layers can be checked for the potential of crack initiation or crack propagation which will affect the chip structural integrity. In addition, equivalent stresses in metal wires/vias can be checked for potential deformation and failures that may affect the function of the chip (see diagram 1100 of FIG. 11).

Figure 12:
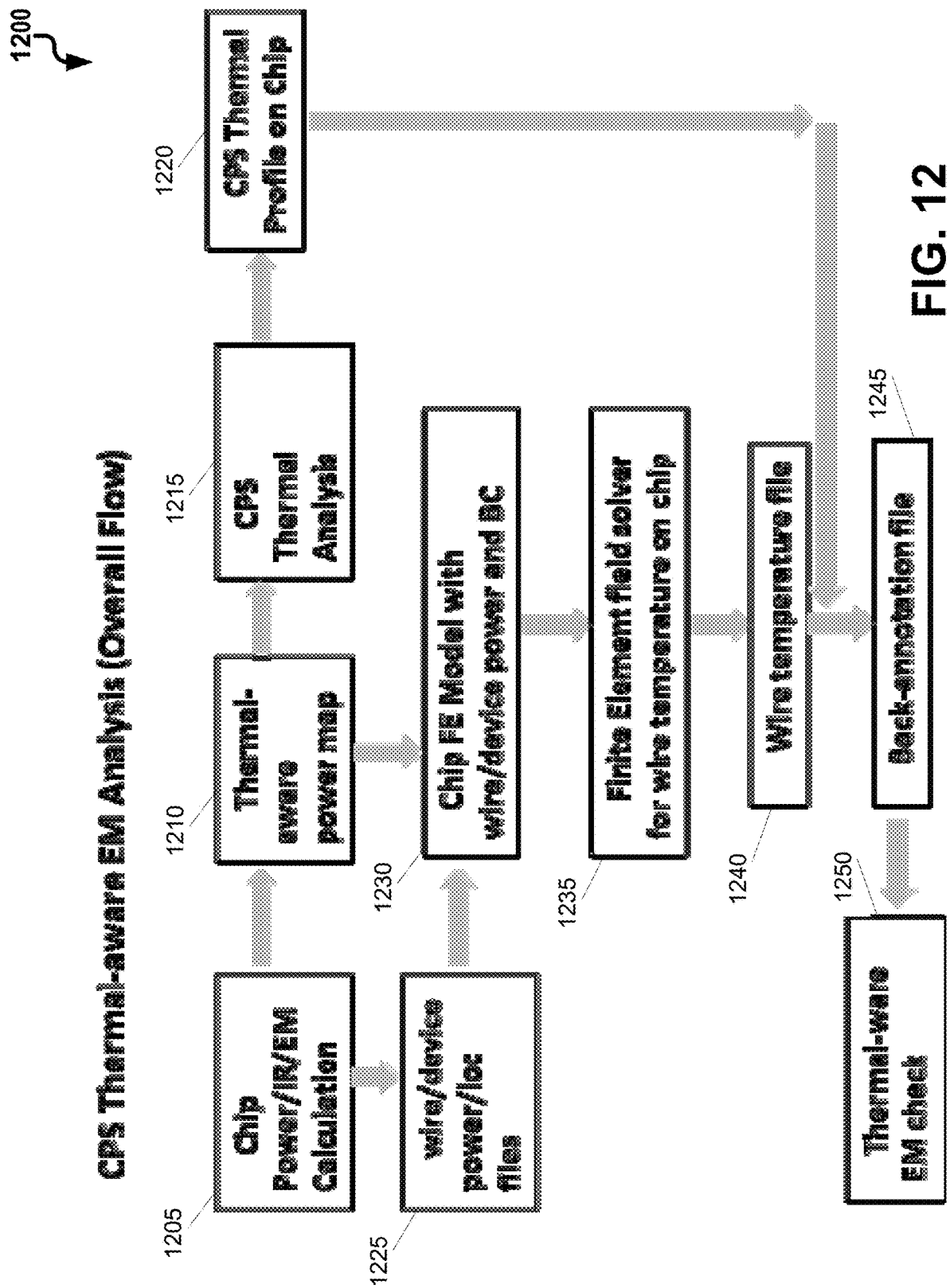
FIG. 12 is a diagram illustrating thermal task breakdown in sub-modeling based thermal-aware EM.

FIG. 12 is a diagram 1200 illustrating thermal task flow details. Initially, at 1205, chip power calculations are setup and performed to dump out chip power map, hot interconnect geometry, Joule heating, and device size/location and power list. Using this information, at 1210, a thermal-aware power map is generated. Further, at 1215, package and system level thermal analysis can be setup and performed using the tile-based power map for CPS thermal responses which results, at 1220, in the generation of a tile-based CPS thermal profile on chip.

In parallel to the generation of the tile-based CPS thermal profile on chip, using the information dumped out at 1205, at 1225, hot interconnect and device size/location/power/DeltaT files are set up as inputs for chip FE sub-model generation. Thereafter, at 1230, a chip FE sub-model can be generated using such inputs and the thermal aware power map. The FE solver then, at 1235, imports chip FE sub-model and solve for thermal field solution using high performance computing such as parallel processing. The wire temperature file is then, at 1240, extracted for the chip sub-model analysis and combined with temperature from CPS thermal profile for each wire. Actions 1230-1240 can be repeated, at 1245, for each sub-model through the full chip area to get the complete back-annotation file for each metal wire and via. The thermal back-annotation file can, at 1250, be imported for thermal-aware EM check for sign off of the chip wire design.

Figure 13:
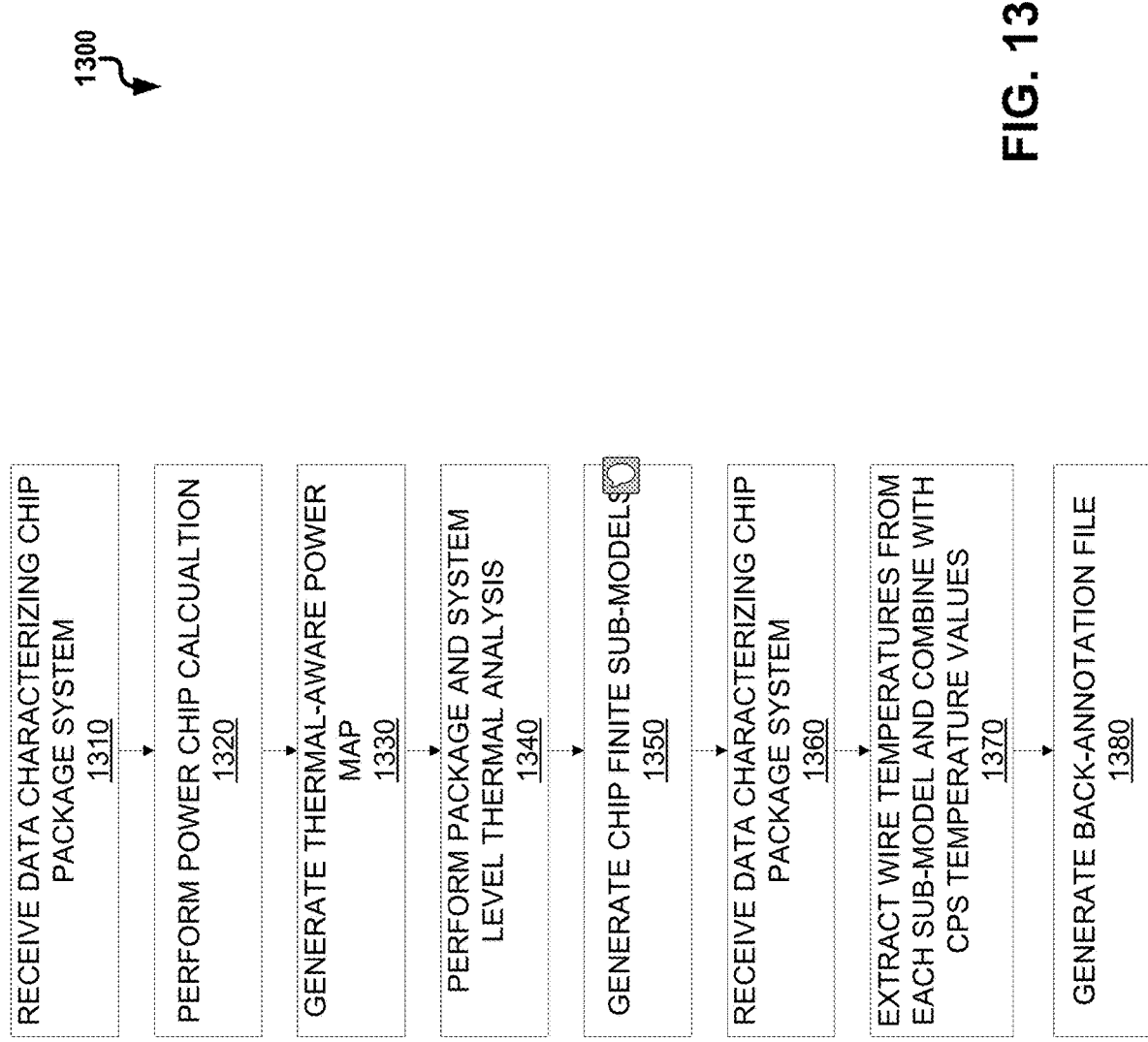
FIG. 13 is a process flow diagram illustrating the use of a finite element method and sub-modeling technology to calculate and extract Joule-heating and self heat-induced temperature on wire segments.

With reference to process flow diagram 1300 of FIG. 13, data is received, at 1310, that characterizes a chip package system (CPS) having a plurality of wires and vias. Thereafter, at 1320, using the received data, a power chip calculation is performed. The power chip calculation is used, at 1330, to generate a thermal-aware power map. Further, at 1340, package and system level thermal analysis is performed using the power map to generate a tile-based CPS thermal profile. A plurality of chip finite element sub-models are then generated, at 1350, that each correspond to a different tile. A thermal field solution is solved, at 1360, for each sub-model so that, for each wire, at 1370, wire temperatures are extracted from the corresponding the chip sub-model analysis and combined with temperature values from the CPS thermal profile. This extracting and combining is then used, at 1380, to generate a back-annotation file covering each metal wire and via in the CPS.

Following simulation of the chip, a physical chip is fabricated based on results of the simulation. In one example, physical stress and temperature behavior of a chip design being simulated is compared to acceptable thresholds to identify design deficiencies (e.g., design deficiencies in a chip that has previously been fabricated or one that is in the design process for fabrication). Chip design is modified, in some embodiments automatically, based on identified deficiencies to alleviate those deficiencies. In one example, an updated design is resimulated to determine whether the deficiencies have been resolved, resulting in an automated, sometimes iterative, chip design process. A real-world, physical chip is fabricated according to the design.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, can include machine instructions for a programmable processor, and/or can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

The computer components, software modules, functions, data stores and data structures described herein can be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality can be located on a single computer or distributed across multiple computers depending upon the situation at hand.

Figure 14:
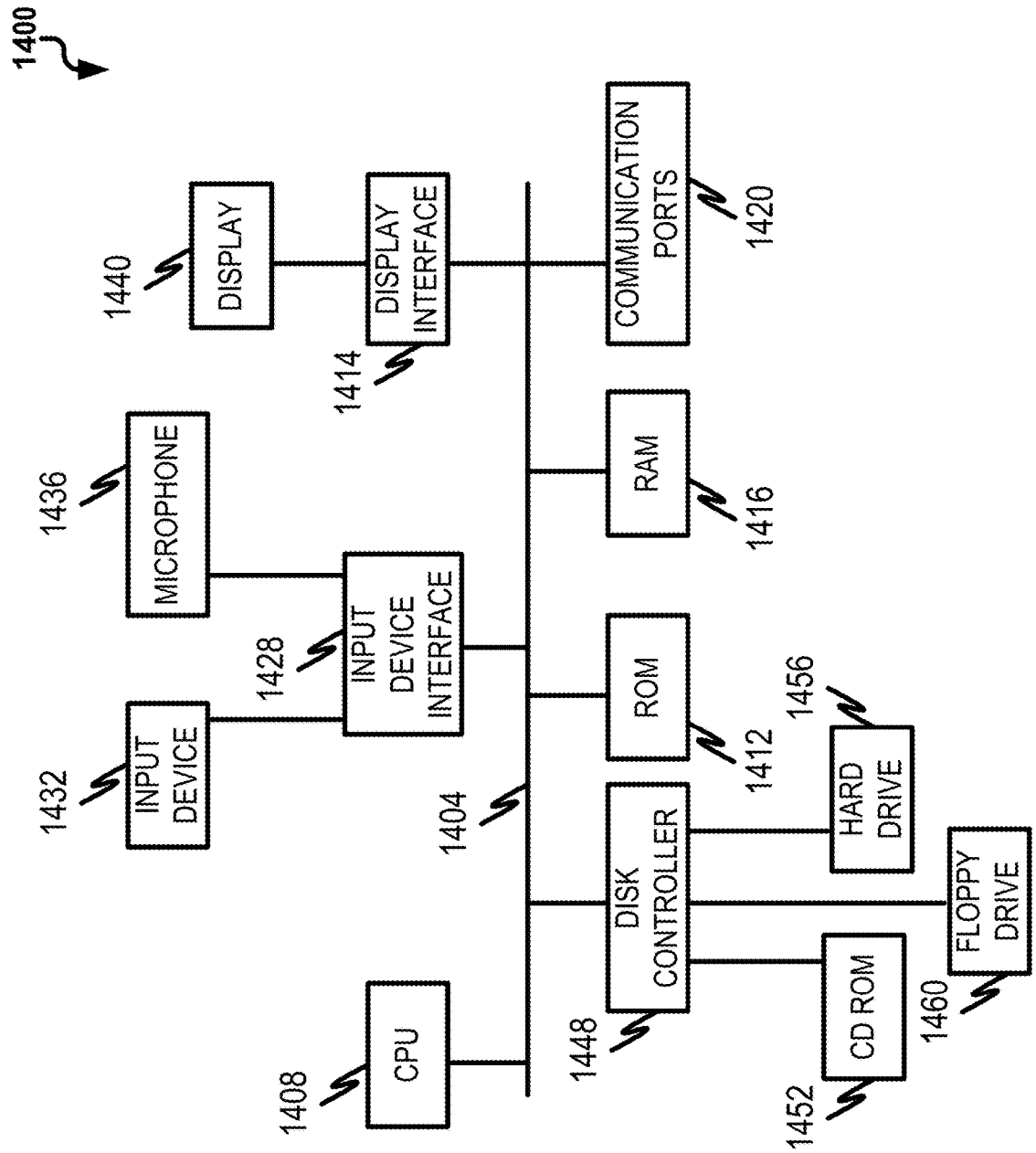
FIG. 14 is a diagram illustrating aspects of a computing device for implementing subject matter described herein.

FIG. 14 is a diagram 1400 illustrating a sample computing device architecture for implementing various aspects described herein. A bus 1404 can serve as the information highway interconnecting the other illustrated components of the hardware. A processing system 1408 labeled CPU (central processing unit) (e.g., one or more computer processors/data processors at a given computer or at multiple computers), can perform calculations and logic operations required to execute a program. A non-transitory processor-readable storage medium, such as read only memory (ROM) 1412 and random access memory (RAM) 1416, can be in communication with the processing system 1408 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 1448 can interface one or more optional disk drives to the system bus 1404. These disk drives can be external or internal floppy disk drives such as 1460, external or internal CD-ROM, CD-R, CD-RW or DVD, or solid state drives such as 1452, or external or internal hard drives 1456. As indicated previously, these various disk drives 1452, 1456, 1460 and disk controllers are optional devices. The system bus 1404 can also include at least one communication port 1420 to allow for communication with external devices either physically connected to the computing system or available externally through a wired or wireless network. In some cases, the communication port 1420 includes or otherwise comprises a network interface.

To provide for interaction with a user, the subject matter described herein can be implemented on a computing device having a display device 1440 (e.g., a CRT (cathode ray tube) or LCD (liquid crystal display) monitor) for displaying information obtained from the bus 1404 to the user and an input device 1432 such as keyboard and/or a pointing device (e.g., a mouse or a trackball) and/or a touchscreen by which the user can provide input to the computer. Other kinds of devices can be used to provide for interaction with a user as well; for example, feedback provided to the user can be any form of sensory feedback (e.g., visual feedback, auditory feedback by way of a microphone 1436, or tactile feedback); and input from the user can be received in any form, including acoustic, speech, or tactile input. In the input device 1432 and the microphone 1436 can be coupled to and convey information via the bus 1404 by way of an input device interface 1428. Other computing devices, such as dedicated servers, can omit one or more of the display 1440 and display interface 1424, the input device 1432, the microphone 1436, and input device interface 1428.

In the descriptions above and in the claims, phrases such as "at least one of" or "one or more of" can occur followed by a conjunctive list of elements or features. The term "and/or" can also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
    receiving data characterizing a chip comprising a plurality of wires;
    performing a thermal analysis to obtain a thermal profile for the chip based on the data, the thermal profile including a respective temperature value for each wire;
    generating a plurality of chip finite element sub-models, each sub-model corresponding to a different sub-region of the chip, wherein the chip finite element sub-models include meshes of wire geometry of the wires;
    solving a thermal field solution for each sub-model;
    extracting, for each sub-model, wire temperature responses from a corresponding thermal field solution;
    combining wire temperature responses from thermal field solutions with respective temperature values of the wires in the thermal profile; and
    generating, based on the extracting and the combining, an output indicating back-annotated temperature covering each wire.

2. The method of claim 1, wherein the thermal analysis is performed based on a power map of the chip, further comprising: performing a power calculation based on the data to generate the power map for the chip.

3. The method of claim 2, wherein the power calculation determines hot interconnect geometry, Joule heating, device size and location, and power list for the chip.

4. The method of claim 1, wherein the thermal field solution is solved via a finite element field solver based on a heat conduction equation according to Fourier's law and conservation of energy.

5. The method of claim 1, wherein the solving is performed in parallel by a plurality of data processor cores.

6. The method of claim 1, wherein the sub-models are generated based on device layout of the chip.

7. The method of claim 1, wherein the extracted wire temperature responses include a temperature rise for each sub-model.

8. The method of claim 7, wherein a back-annotated temperature covering one of the wires includes a temperature value of the one wire in the thermal profile plus a temperature rise of the one wire from a corresponding thermal field solution.

9. The method of claim 6, wherein the generation of the sub-models comprises: subdividing a wire geometry specified in the received data into wire segments based on geometry branching for electronic networking.

10. The method of claim 9 further comprising: flattening the subdivided wire geometry to generate a two dimensional template mesh including outlines on every layer of the chip.

11. The method of claim 10 further comprising: creating two dimensional layer meshes for each layer of the chip.

12. The method of claim 10 further comprising: generating three dimensional finite element sub-models using line elements for the wire segments.

13. The method of claim 1, further comprising: determining effects of electron scattering in connection with the thermal conductivity of metal in thin layers.

14. The method claim 1, further comprising: converting at least one sub-model into a thermal stress model to characterize thermal stress in interconnection layers.

15. The method of claim 1, wherein a model for performing the thermal analysis and the sub-models are each formulated based on data obtained via a real-world, physical temperature measurement of an existing chip.

16. The method of claim 1, further comprising: adjusting a design parameter of the chip based on the output for fabricating a real-world, physical embodiment of the chip based on the adjusted design parameter.

17. The method of claim 16, further comprising: repeating said solving a thermal field solution for one or more sub-models based on an updated design.

18. The method of claim 9, wherein one of the wires includes a wire segment with a thermal gradient according to the thermal field solution, and wherein an electromigration analysis for the chip is based on an average or a maximum temperature of elements inside the wire segment.

19. A system comprising:
    at least one data processor; and a non-transitory computer-readable medium encoded with instructions for commanding the at least one data processor to perform operations comprising:
    receiving data characterizing a chip comprising a plurality of wires;
    performing a thermal analysis to obtain a thermal profile for the chip based on the data, the thermal profile including a respective temperature value for each wire;
    generating a plurality of chip finite element sub-models, each sub-model corresponding to a different sub-region of the chip;
    solving a thermal field solution for each sub-model;
    extracting, for each sub-model, wire temperature responses from a corresponding thermal field solution;
combining wire temperature responses from thermal field solutions with respective temperature values of the wires in the thermal profile; and
generating, based on the extracting and the combining, an output indicating back-annotated temperature covering each wire.

20. A non-transitory computer program product storing instructions which, when executed by at least one data processor forming part of at least one computing device, execute steps comprising:
    receiving data characterizing a chip comprising a plurality of wires;
    performing a thermal analysis to obtain a thermal profile for the chip based on the data, the thermal profile including a respective temperature value for each wire;
    generating a plurality of chip finite element sub-models, each sub-model corresponding to a different sub-region of the chip;
    solving a thermal field solution for each sub-model;
    extracting, for each sub-model, wire temperature responses from a corresponding thermal field solution;
    combining wire temperature responses from thermal field solutions with respective temperature values of the wires in the thermal profile; and
    generating, based on the extracting and the combining, an output indicating back annotated temperature covering each wire.

\* \* \* \* \*